United States Patent [19]

Falletti

[11] Patent Number: 4,865,742

[45] Date of Patent: Sep. 12, 1989

[54] METHOD OF TREATING POLLUTED OIL-IN-WATER EMULSIONS OR MICROEMULSIONS

[75] Inventor: Florence Falletti, Chambery, France

[73] Assignee: Societe Des Ceramiques Techniques, Bazet, France

[21] Appl. No.: 179,365

[22] Filed: Apr. 8, 1988

[51] Int. Cl.$^4$ .............................................. B01D 37/08
[52] U.S. Cl. ..................................... 210/637; 210/651; 210/799; 208/182
[58] Field of Search ............... 210/650, 651, 799, 637, 210/500.25, DIG. 5; 208/179, 187, 182; 585/818

[56] References Cited

U.S. PATENT DOCUMENTS

| | | | |
|---|---|---|---|
| 3,977,967 | 8/1976 | Trulson et al. | 210/651 |
| 4,060,488 | 11/1977 | Hoover et al. | 210/321.82 |
| 4,078,112 | 3/1978 | Bibeau | 210/651 |
| 4,168,229 | 9/1979 | Chambers | 210/799 |
| 4,411,790 | 10/1983 | Arod et al. | 210/799 |
| 4,652,376 | 3/1987 | Kumaoka | 210/799 |

FOREIGN PATENT DOCUMENTS 2422777  11/1974  Fed. Rep. of Germany ...... 210/650

*Primary Examiner*—Richard V. Fisher
*Assistant Examiner*—Coreen Y. Lee
*Attorney, Agent, or Firm*—Sughrue, Mion, Zinn, Macpeak & Seas

[57] ABSTRACT

A method of treatment of polluted emulsions or microemulsions (10) of oil in water, said method making use of tangential filtering through at least one membrane (1) constituted by a porous microfiltration structure which is constituted by titanium oxide, at least on the surface thereof. The method can be used to regenerate emulsions or micro-emulsions of oil in water.

12 Claims, 1 Drawing Sheet

METHOD OF TREATING POLLUTED OIL-IN-WATER EMULSIONS OR MICROEMULSIONS

REFERENCE TO RELATED APPLICATIONS

This application relates to application Ser. No. 101,927, filed Sep. 28, 1987 to Stanislas Galaj et al now abandoned, entitled "A Ceramic Filter Membrane and Method of Manufacture", and to a continuation-in-part application thereof, Ser. No. 179,364, filed Apr. 8, 1988, entitled "Filter Membrane and Method of Manufacture", both assigned to the common corporate assignee.

The present invention relates to a method of treating polluted oil-in-water emulsons or microemulsions used, in particular, as fluids during machining operations and referred to as aqueous cutting fluids.

BACKGROUND OF THE INVENTION

Aqueous cutting fluids are defined by international standard ISO 6743/7—(T60-504)—1986. They comprise emulsions or microemulsions made from concentrates which are mixtures of emulsifying agents and appropriate additives together with refined mineral oils, diluted in water.

In use, these aqueous cutting fluids are contaminated with metal particles that come from the machining of metal parts, by foreign oils leaking from the machine, and also by bacteria. In order to limit this contamination, coarse purifying devices exist for the purpose of removing physical contaminants (swarf, debris) and foreign oils.

Physical contaminants may be removed by:
magnetic separators;
dragging the dirty emulsion in the tank containing the emulsion;
filtering under pressure or suction through paper filters or through diatom filters;
hydrocyclones; or
centrifugal purifiers.
Foreign oils may be removed by:
skimming the used emulsion tank; or
centrifuging either the entire emulsion or else the surface layer thereof as obtained via a floating strainer.

None of these mechanical coarse purifying systems is completely effective and a portion of the above-mentioned pollutants remain in the cutting fluid.

When the contamination becomes too concentrated, aqueous cutting fluids no longer perform their functions properly: they are then replaced and sent to an officially agreed treatment center for disposal, and this takes place periodically. It is illegal to discard any oil, emulsified or otherwise into the drainage system since discarding such used fluids into the natural environment constitutes a danger by virtue of the chemical composition thereof and also because of the pollutants contained therein.

Tangential filtering methods are known for processing emulsions using various types of support associated with ultrafiltration membranes having a pore diameter lying in the range 40 Å to 1000 Å.

For example, it is mentioned in the "Guide d'emploi des fluides de coupe" (Cutting fluid user guide) published by CETIM, volume 1, 1979, page 183, that the ultrafiltration module then separates an ultrafiltrate which is practically free from oil and a residue having a very high oil concentration which is unusable as a cutting fluid and which is to be destroyed.

It is also mentioned by B. Bartoli (C.E.A.) in an article "La séparation des émulsions par ultrafiltration" (Separating emulsions by ultrafiltration), taken from a CETIM document entitled "Les fluide de Coupe aqueux" (Aqueous cutting fluids), Nov. 21-23, 1978, page 101, that an ultrafiltration method separates a polluted emulsion into an aqueous phase and an oily phase that is to be dstroyed.

In other words, if a tangential ultrafiltration method is applied to cutting fluids, the pollutants are indeed removed, however the oily phase is separated from the aqueous phase, in other words the emulsion is destroyed.

The object of the present invention is to provide a method of treatment by tangential filtration enabling pollutants to be removed without destroying the emulsion or the microemulsion of oil in water, in other words enabling said emulsion to be regenerated.

SUMMARY OF THE INVENTION

The present invention provides a method of treating polluted oil-in-water emulsions or microemulsions, said method implementing tangential filtration through at least one membrane, with said membrane having a porous microfiltration structure which is constituted, at least on the surface thereof, by titanium oxide.

Such a membrane is either a membrane comprising a porous structure with the entire surface of the pores being covered with a film of titanium oxide, or else a porous structure which is entirely constituted by sintered grains of titanium oxide.

If the membrane comprises a plurality of superposed layers, it is the surface layer having the smallest diameter pores which provides the filter function.

It has been observed, most surprisingly, that when using this particular membrane, the oily phase does not separate from the aqueous phase of the emulsion, which emulsion thus retains its intrinsic properties, and in particular its lubrifying powers. The regenerated emulsion can thus be recycled for use in machines.

In a preferred implementation of the invention, said microfiltration membrane has pores in its microporous surface layer with a diameter lying between 0.2 microns and 15 microns, and preferably lying between 3 microns and 8 microns.

When said membrane comprises a porous structure in which the surface of the pores is entirely covered by a film of titanium oxide, the material of the porous structure may be selected from sintered ceramics, sintered metals, microporous carbon, and microporous glass. In which case, the thickness of the titanium oxide film should lie between 0.1% and 10% of the mean pore diameter in said microporous surface layer.

Before any regeneration cycle, said membrane must be thoroughly cleaned and chemically inert.

The method in accordance with the invention is preferably performed at a temperature lying between 15° C. and 35° C. The filtering pressure may lie between 1 bar and 5 bars, and is preferably about 2 bars to 2.5 bars.

The tangential flow speed lies between 1 meter per second (m/s) and 4 m/s, and is preferably about 2 m/s.

The emulsion in its tank is preferably lightly stirred so that the distribution of polluting items is relatively uniform.

The membrane must be unclogged regularly.

BRIEF DESCRIPTION OF THE DRAWINGS

An implementation of the invention is described by way of example with reference to the accompanying drawing, in which.

MORE DETAILED DESCRIPTION

Figure 1:
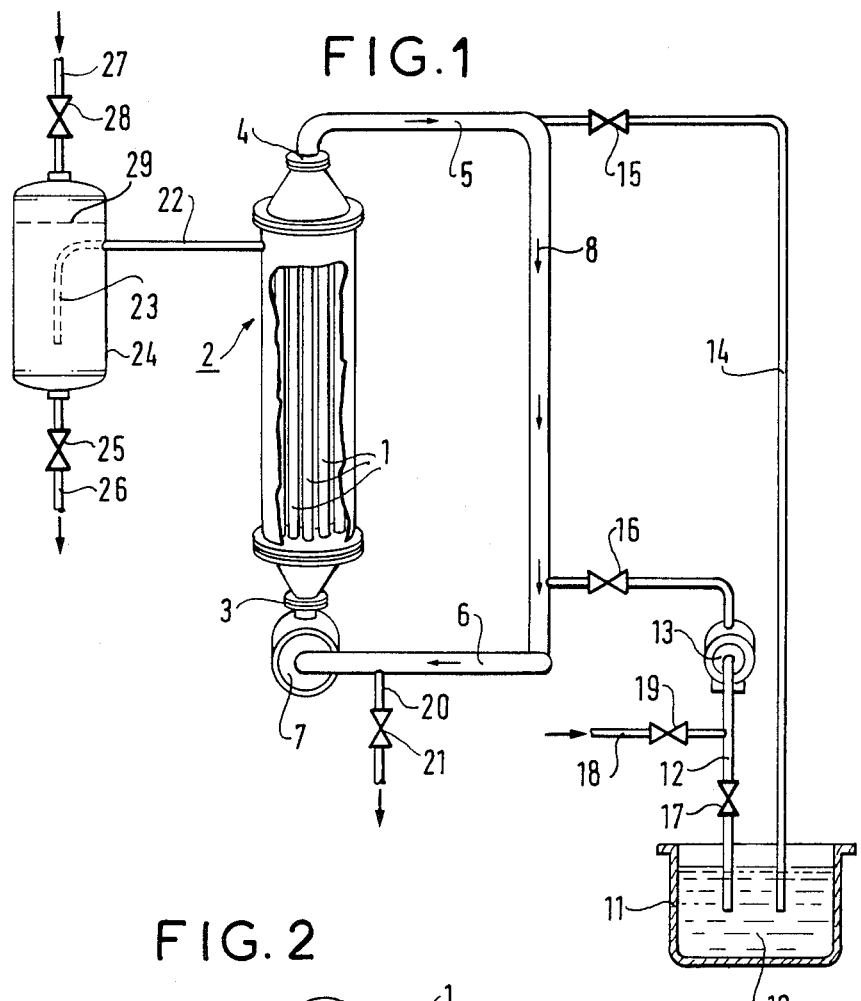
FIG. 1 is a highly diagrammatic representation of a microfiltration device in accordance with the invention.

FIG. 1 is a diagram of a filter installation of the "half open loop" type. It comprises a set of filter elements 1 known as membranes, which are substantially cylindrical and disposed in parallel with one another in a stainless steel housing 2 having an inlet 3 and an outlet 4. The filter elements 1 are described in greater detail below. The outlet 4 is connected to the inlet 3 via a set of pipes 5 and 6 associated with a circulation pump 7. Arrows 8 indicate the normal direction of fluid flow around the filter loop.

The emulsion or microemulsion 10 to be treated is stored in a tank 11 connected to pipe 5 via a duct 12 including a feed pump 13 and two valves 16 and 17. A pipe 14 fitted with a valve 15 connects the outlet 4 from the housing 2 to the tank 11. A pipe 18 associated with the valve 19 leads to the duct 12 and serves to inject hot water and detergent, when necessary. A duct 20 associated with a valve 21 connects to the pipe 6 and is intended for use in removing the residue. The filtrate leaves the top portion of the housing 2 via a pipe 22 which terminates with a downwardly curved portion 23 in an outlet cylinder 24 having an outlet 26 associated with a valve 25. The cylinder also includes an inlet duct 27 associated with a valve 28 for injecting compressed air. All of the pipework in the installation is made of stainless steel.

Figure 2:
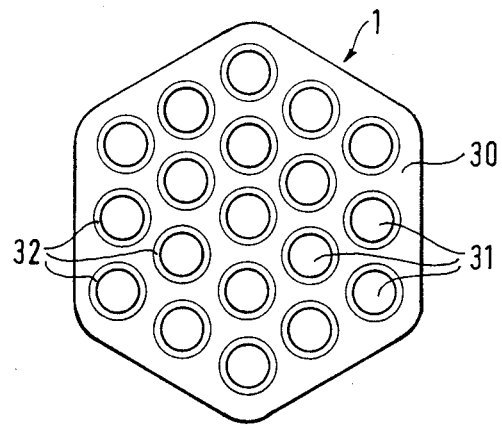
FIG. 2 is a diagrammatic end view of a filter element or membrane belonging to the FIG. 1 device.

Each filter element (also called "membrane") visible end-on in FIG. 2 comprises a macroporous support of sintered alumina having a substantially hexagonal cross-section and fitted with a plurality of mutually parallel channels 31. The porosity of the macroporous support is such that the diameter of its pores is about 15 microns. The inside wall of the channels is coated with one or more microporous layers constituted by grains of sintered alumina. The entire inside surface and outside surface of the porous structure of the filter element is coverd with a thin and continuous film of the titanium oxide. The diameter of the pores in the top layer of this membrane is about 5 microns. The titanium oxide film is about 50 Å thick.

The fluid to be regenerated 10 is an emulsion or a microemulsion of oil in water. It may be constituted, for example, by the fluids referenced MAA, MAC, MAD, or MAE in the above-specified ISO standard. The abbreviations have the following meanings:

MAA: a concentrate which, when mixed with water, gives a milky emulsion having anti-corrosion properties;

MAC: an MAA type concentrate additionally having "extreme pressure: properties;

MAD: a concentrate both having friction-reducing properties and "extreme pressure" properties; and MAE: a concentrate, which when mixed with water, gives transluscent emulsions, or microemulsions, having anticorrosion properties.

Treatment takes place at ambient temperature and as follows:

The valves 19, 21, and 27 are closed while the valves 15, 16, 17 and 25 are opened. The pumps 13 and 7 cause the fluid 10 to flow along the filter elements 1 inside the housing 2. The flow rate is about 1 m$^3$ per hour per m$^2$ of membrane area. The speed of tangential flow is 2 m/s. The average filtering pressure is 2 bars to 2.5 bars.

Since the filter loop is open via the pipe 14 and the valve 15, flow takes place in the tank 11 and the fluid 10 is stirred to some extent, thereby homogenizing the pollutant content throughout the volume of the fluid.

During each regeneration cycle, the membranes 32 are automatically unclogged several times by applying back-pressure in the loop. The principle of this method is described in an article by S. Galaj, A. Wicker, J. P. Dumas, J. Gillot, and D. Garcera in the publication "Le Lait" (Milk), 1984, 64, pp. 129–140. To do this, the valves 15, 16 and 25 are closed while the valve 28 is opened. Compressed air at a pressure of 10 bars is applied to the cylinder 24 which initially contains filtrate up to the level marked 29. The filtrate then flows in the reverse direction through the filter elements 1, and the polluted tangential flow is eliminated via pipe 20.

After implementing a complete regeneration cycle in accordance with the invention, 1200 liters of polluted fluid 10 give rise to 1180 liters of regenerated cutting fluid ready for immediate reuse, and 20 liters of residue to be destroyed, i.e. less than 2% of the initial volume of fluid.

Quite remarkably, this regeneration may be performed several times on the same cutting fluid without the fluid losing its properties.

Between two regeneration operations, the filter elements or membranes 1 should be cleaned so as to make them perfectly clean and chemically inert. This is done as follows: valve 21 is opened to remove the residue. Valve 17 is closed and valve 19 is opened in order to apply hot water including detergents to the loop at a pressure of 1 bar. Rinsing is then performed until the membranes are inert.

Naturally, the invention is not limited to the embodiment described above.

The porous structure of the membrane which supports the film of titanium oxide may be made of a material other than alumina, said material being selected from those specified above. This material may be titanium oxide itself.

The filtering pressure may be as low as 1 bar which corresponds to a low limit value for the flow rate as from the beginning of clogging, and 5 bars which correspond to the membrane clogging too quickly.

In order to avoid any risk of the emulsion breaking, it is preferable to remain within the temperature range 15° C. to 35° C.

Finally, the device shown is given purely by way of example to explain how it operates.

I claim:

1. In a method of treating oil emulsions or microemulsios in polluted water, which method uses tangential filtration through at least one membrane, the improvement wherein said membrane comprises a porous microfiltration structure having at least a surface layer of titanium oxide with a pore diameter of between 0.2 microns and 15 microns whereby the oil emulsions or microemulsions regenerate without separation of the oily phase from the aqueous phase thereby enabling the oil emulsions or microemulsions to be reused immediately.

2. A method of treatment according to claim 1, wherein said porous microfiltration structure comprises a macroporous support and at least one microporous layer with said porous microfiltration structure as a whole being covered by said titanium oxide.

3. A method of treatment according to claim 1, wherein the diameter of the pores in the surface layer of said porous microfiltration structure is between 3 microns and 8 microns.

4. A method of treatment according to claim 1, wherein said porous microfiltration structure is made of a material selected from: sintered ceramics, sintered metals, microporous carbon, and microporous glass; with the entire external surface including the surface inside the pores of said porous structure being covered in a thin and continuous film of said titanium oxide.

5. A method of treatment according to claim 4, wherein the thickness of said film is between 0.1% and 10% of the mean diameter of the pores of the microporous surface layer.

6. A method of treatment according to claim 1, wherein said at least a surface layer of titanium oxide consists of sintered grains of titanium oxide.

7. A method of treatment according to claim 1, wherein said tangential filtration through said at treatment temperature of between 15° C. and 35° C.

8. A method of treatment according to claim 1, wherein said tangential filtration through said at least one membrane is at a filter pressure of between 1 bar and 5 bars 9. A method of treatment according to claim 8, wherein the filter pressure is between 2 bars and 2.5 bars.

10. A method of treatment according to claim 1, wherein a speed of tangential flow of the emulsion or the microemulsion through said at least one membrane is between 1 m/s and 4 m/s.

11. A method of treatment according to claim 10, wherein the speed of tangential flow is about 2 m/s.

12. A method of treatment according to claim 1, wherein prior to the implementation of said tangential filtration, said emulsion, or microemulsion, is subjected to light stirring in a storage tank, thereby uniformly distributing its pollution contents.

* * * * *